(12) United States Patent
Huan

(10) Patent No.: US 6,854,187 B2
(45) Date of Patent: Feb. 15, 2005

(54) BLADE CLAMP MECHANISM

(75) Inventor: Haichun Huan, Suzhou (CN)

(73) Assignee: Positec Power Tools (Suzhou) Co., LTD, Suzhou (CN)

( * ) Notice: Subject to any disclaimer, the term of this patent is extended or adjusted under 35 U.S.C. 154(b) by 0 days.

(21) Appl. No.: 10/756,226

(22) Filed: Jan. 12, 2004

(65) Prior Publication Data

US 2004/0226177 A1 Nov. 18, 2004

(51) Int. Cl.$^7$ .............................................. B27B 19/02
(52) U.S. Cl. ............................ 30/392; 279/77; 30/339
(58) Field of Search ..................... 30/392, 393, 394, 30/338, 339; 279/76, 77, 79; 83/699.21

(56) References Cited

U.S. PATENT DOCUMENTS

| | | | | |
|---|---|---|---|---|
| 4,106,181 A | * | 8/1978 | Mattchen | 29/450 |
| 5,322,302 A | * | 6/1994 | Quirijnen | 279/22 |
| 5,987,758 A | * | 11/1999 | McCurry et al. | 30/392 |
| 6,101,726 A | * | 8/2000 | Laverick | 30/392 |
| 6,112,420 A | | 9/2000 | Shickerling | 30/392 |
| 6,209,208 B1 | | 4/2001 | Marinkovich et al. | 30/392 |
| 6,308,425 B1 | * | 10/2001 | Schumann | 30/392 |
| 6,467,177 B2 | * | 10/2002 | Eichberger | 30/392 |
| 6,502,317 B2 | * | 1/2003 | Dassoulas et al. | 30/392 |

FOREIGN PATENT DOCUMENTS

| | | | | |
|---|---|---|---|---|
| DE | 4313718 A | | 11/1994 | B23D/51/10 |
| DE | 20013789 U | | 12/2000 | B23D/51/08 |
| EP | 0582326 A | | 2/1994 | B23D/51/10 |
| JP | 2002011703 | | 1/2002 | B27B/11/06 |

* cited by examiner

Primary Examiner—Hwei-Siu Payer
(74) Attorney, Agent, or Firm—Pate Pierce & Baird

(57) ABSTRACT

The present invention relates to a keyless blade clamp mechanism including a base, a sliding block slidably disposed on the base and a clamping lever pivotally connected on the base. On one pivot side of the clamping lever is a clamp plate and on the other pivot side of the clamping lever is a plate. The base has a supporting surface opposing the clamp plate. In use, the sliding block slides to engage and press the plate causing the clamp plate to pivot and a gap to appear between the clamp plate and the supporting surface to permit a saw blade to be inserted into (or be pulled out of) the gap. The present invention has the advantage that few components are involved and it is easily manufactured at low cost.

20 Claims, 3 Drawing Sheets

BLADE CLAMP MECHANISM

BACKGROUND

1. Technical Field of the Invention

The present invention relates to a blade clamp mechanism (e.g., a keyless blade clamp mechanism) and to a cutting assembly (such as a saw) comprising the blade clamp mechanism.

2. The Background Art

U.S. Pat. No. 6,209,208 discloses a clamping mechanism which comprises a driving subassembly with an outer cam surface and an inner cam surface and a locking subassembly. The locking subassembly includes an outer follower surface adapted to be driven by the outer cam surface and an inner follower surface adapted to be driven by the inner cam surface whereby the locking subassembly is moved in the radial direction and locks the blade when the driving subassembly rotates. The inner cam surface presses directly on the outer cam surface to actuate the movement in the radial direction therefore the clamping mechanism is laborious to operate. Furthermore, the components included in the clamping mechanism are subject to relatively large manufacturing errors and the integral cam is difficult to manufacture.

OBJECT AND SUMMARY OF THE INVENTION

It is an object of the present invention to provide a keyless blade clamp mechanism with a simple structure.

Thus viewed from one aspect the present invention provides a keyless blade clamp mechanism for clamping a blade comprising:

a base with a supporting surface for supporting the blade;
a sliding block slidably mounted on the base;
an elastic member mounted between the sliding block and the base for giving the sliding block an upward tendency; and
a clamping lever pivotally mounted on a horizontal pivot on the base which includes on a first side of the pivot and opposed to the supporting surface a clamp plate capable of bearing against the upperside of the blade and on a second side of the pivot a downwardly dependent plate.

The keyless blade clamp mechanism of the present invention includes a base, a sliding block slidably disposed on the base and a clamping lever pivotally connected to the base. On one pivot side of the clamping lever is a clamp plate and on the other pivot side of the clamping lever is a plate. The base has a supporting surface opposing the clamp plate. In use, the sliding block slides to engage and press the plate causing the clamp plate to tilt and a gap to appear between the clamp plate and the supporting surface to permit a saw blade to be inserted into (or be pulled out of) the gap. The present invention has the advantage that few components are involved and it is easily manufactured at low cost.

Preferably the keyless blade clamp mechanism further comprises
a locking bevel at a lower end of the sliding block and
a plunger at an upper end of the sliding block wherein:
when the clamp plate clamps the blade, the locking bevel is engaged with an end of the plate remote from the pivot and the plunger is disengaged from an end of the plate at or near to the pivot and when the clamp plate is unclamped, the plunger engages and presses the end of the plate at or near to the pivot.

In a preferred embodiment, the end of the plate remote from the pivot is beveled and when the clamp plate clamps the saw blade, the locking bevel is engaged with the beveled end of the plate remote from the pivot.

In a preferred embodiment, a spring is mounted between the sliding block and the base and pivotally biases the sliding block upwardly giving the clamp plate a tendency to clamp the blade.

In a preferred embodiment, a spring is mounted between the sliding block and the base and biases the sliding block upwardly giving the plunger a tendency to disengage the plate.

In a preferred embodiment, the sliding block extends through a through hole on the clamp plate.

In a preferred embodiment, the plate is downwardly dependent at approximately 90° to the clamp plate.

Preferably the keyless blade clamp mechanism further comprises:
a positioning protrusion on the supporting surface or the clamp plate cooperable with a positioning hole in the blade.

Viewed from a further aspect the present invention provides a blade clamp mechanism comprising:
a hollow base with opposing sides defining an upper supporting edge for supporting the blade;
a pivot mounted prominently on the supporting edge;
a clamping lever pivotally mounted on the pivot which includes on a first side of the pivot a clamp plate capable of bearing against the upperside of the blade supported on the supporting edge and on a second side of the pivot a plate downwardly dependent into the hollow base; and
an actuating member passing through the clamp plate for actuating the clamp plate between a clamping position in which the clamp plate is clamped against the blade supported on the supporting edge and a non-clamping position in which the clamp plate is not clamped against the blade supported on the supporting edge,
an elastic member mounted between the actuating member and the base for giving the actuating member an upward tendency,
wherein the actuating member is compressively mounted on the hollow base such that a lower portion of the actuating member is urged into engagement with a lower portion of the plate to pivotally bias the clamp plate into the clamping position.

In accordance with the invention the blade clamp mechanism has a tendency towards the clamping position and is manually manipulable into the non-clamping position.

Preferably the actuating member is compressively mounted by a compression spring between the actuating member and the hollow base to bias the blade clamp mechanism towards the clamping position.

Preferably the actuating member is slidably mounted on the hollow base.

Preferably the lower portion of the actuating member has a beveled face (e.g., a face of the rear wall).

Preferably the lower portion of the plate has a beveled face (e.g., a face of the front wall).

In a preferred embodiment, the actuating member comprises:
an exteriorly manipulable plunger extending upwardly and rearwardly from a hollow lower body, wherein the hollow body is compressively mounted on the hollow base such that in the clamping position the plunger is linearly biased into disengagement from the upper end of the plate. The plunger typically comprises an inverted, substantially U-shaped body. A compression spring may be connected internally to the hollow lower body. A face of the rear wall of the hollow lower body may be beveled. The side walls of the hollow lower body may be adapted (e.g., raised) to cooperate slidably with adjacent interior walls of the hollow base.

Preferably the plunger is linearly manipulable into engagement with the upper end of the plate to pivot the clamp plate from the clamping into the non-clamping position.

Preferably the lower portion of the plate has a beveled face and the lower portion of the actuating member has a beveled face whereby the beveled face of the actuating member is urged into engagement with the beveled face of the plate to pivotally bias the clamp plate into the clamping position.

The pivot may be mounted on prominences on the upper supporting edge of the opposing sides of the hollow base. The prominences may be substantially semi-circular prominences with coaxial apertures. The reminder of the upper supporting edge is largely flat.

The clamp plate typically comprises a plate body with twin parallel arms pivotally mounted in spaced apart relationship on the pivot. The space between the arms is sufficient to permit the actuating member to pass through. The plate may be downwardly dependent into the hollow base from the twin arms.

Viewed from a yet further aspect the present invention provides a keyless blade clamp mechanism characterized in comprising a base, a sliding block slidably disposed on said base, a clamping lever pivotally connected with said base, one pivot side of said clamping lever being a clamp plate, the other pivot side of said clamping lever being an oppressed plate, said base having a supporting surface opposite to said clamp plate.

Viewed from a still yet further aspect the present invention provides a cutting assembly comprising a blade clamp mechanism as defined hereinbefore and a blade.

The present invention will now be described in a non-limitative sense with reference to the accompanying Figures.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DESCRIPTIONS OF THE PREFERRED EMBODIMENTS

It will be readily understood that the isolated protein sequences and methodologies of the present invention, as generally described and illustrated in the Figures herein, could be arranged and designed in a wide variety of different configurations. Those of ordinary skill in the art will, of course, appreciate that various modifications to the details herein may be made without departing from the essential characteristics of the invention, as described. Thus, the following more detailed description of the embodiments of the isolated protein sequences and methodologies of the present invention, as represented in FIGS. 1–5, is not intended to limit the scope of the invention, as claimed, but it is merely representative of the presently preferred embodiments of the invention.

Figure 1:
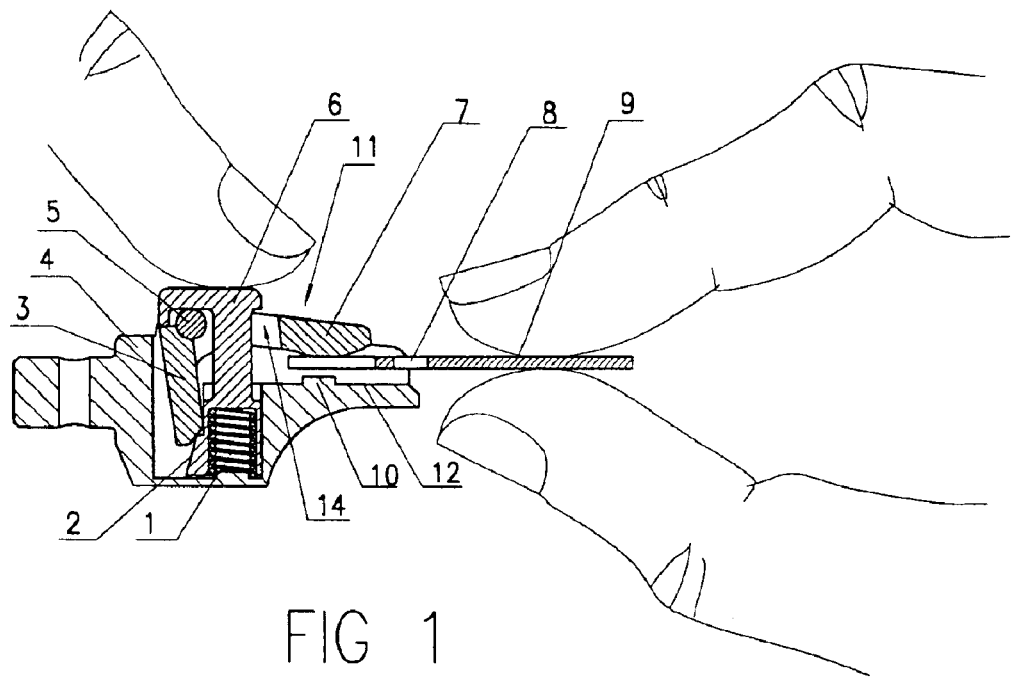
FIG. 1 shows a sectional view of an embodiment of the present invention (saw blade being inserted)
Figure 2:
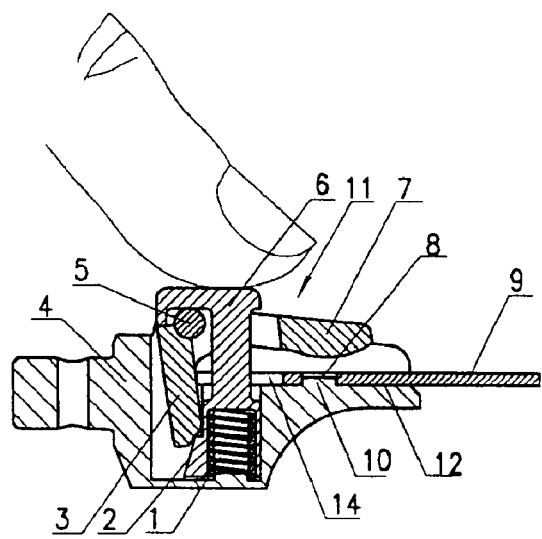
FIG. 2 shows a sectional view of the embodiment of the present invention (saw blade has been inserted)
Figure 3:
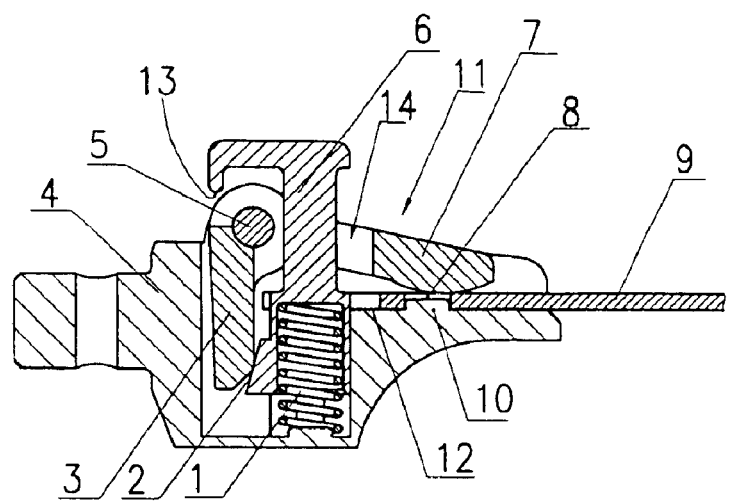
FIG. 3 shows a sectional view of the embodiment of the present invention in the clamping position.
Figure 5:
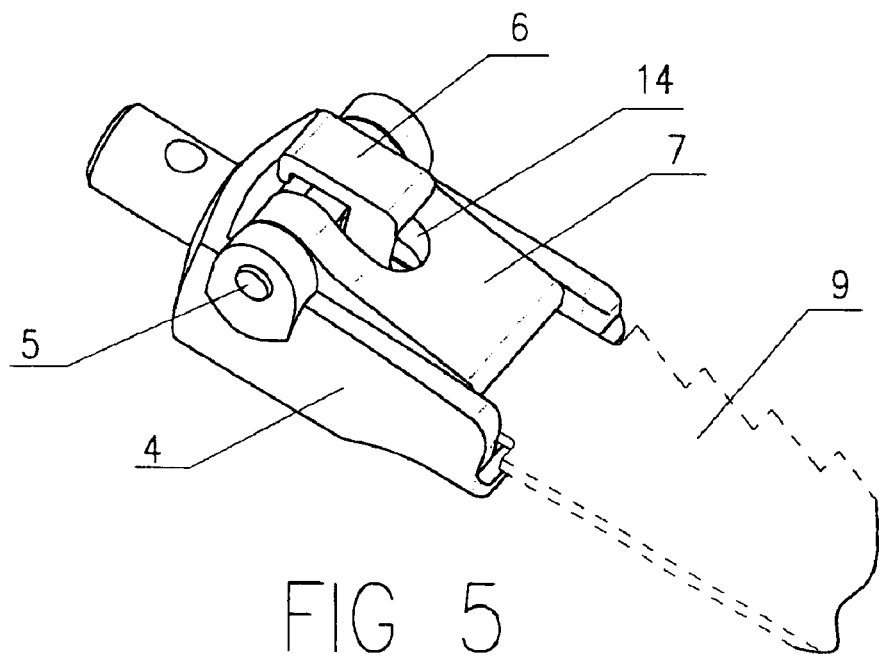
FIG. 5 shows a perspective view of the assembled embodiment of the present invention.
Figure 4:
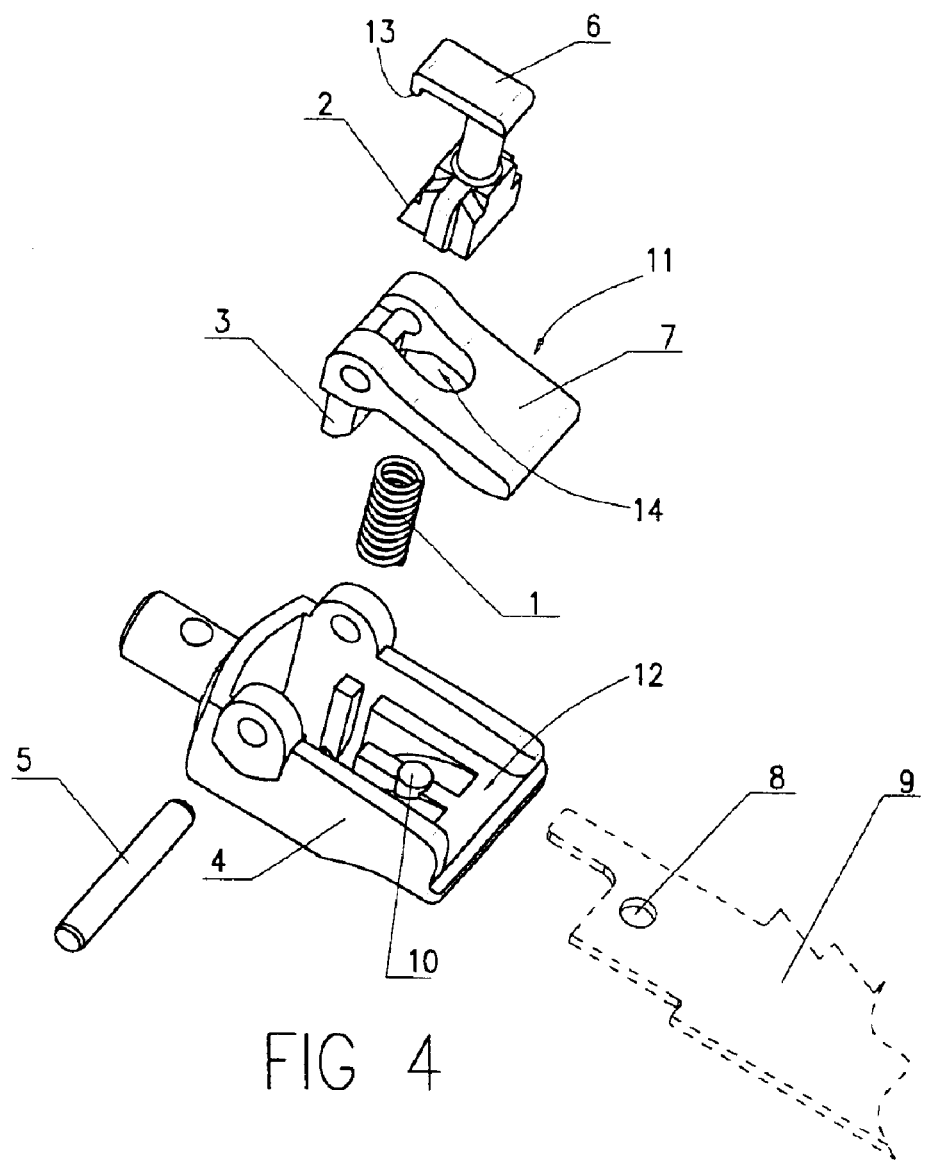
FIG. 4 shows an exploded perspective view of the embodiment of the present invention.

FIGS. 1, 2 and 3 show a sectional view of an embodiment of the blade clamp mechanism of the present invention during and after insertion of a saw blade 9 in clamping and non-clamping positions. The blade clamp mechanism includes a hollow base 4 with an upper supporting surface (edge) 12 for supporting the underside of the saw blade 9. A clamping lever 11 is pivotally mounted on a horizontal pivot 5 of the base 4 and includes on a first side of the pivot 5 a clamp plate 7 capable of bearing against the upperside of the saw blade 9 and on a second side of the pivot 5 a plate 3 downwardly dependent into the hollow base 4 at approximately 90° to the clamp plate 7. An inward face of the free end of plate 3 (i.e., the end remote from the pivot 5) is beveled.

A sliding block 6 slidably mounted on the base 4 has (at its lower end) a locking bevel 2 and at its upper end an inverted U-shaped plunger 13 capable of engaging the upper end of plate 3. The sliding block 6 extends through a through hole 14 on the clamp plate 7. By means of a spring 1 mounted inside a cavity in the sliding block 6 and on a protrusion (not shown) on the base 4, the sliding block 6 is biased upwardly (i.e., the blade clamp mechanism is biased towards the clamping position as described hereinafter).

In the clamping position (FIG. 3) of the blade clamp mechanism, the clamp plate 7 is clamped (see FIG. 3) against the saw blade 9 on the supporting surface 12. In this position, the locking bevel 2 engages the beveled face of the free end of plate 3 and the plunger 13 is disengaged from the upper end of plate 3. By virtue of the engagement of the locking bevel 2 and the beveled face of the free end of plate 3, the spring 1 gives the plate 3 a tendency to rotate (in the clockwise direction of FIG. 3) and (by virtue of its linear restoring force) gives the plunger 13 a tendency to remain disengaged from the upper end of plate 3.

To insert the blade clamp 9, the sliding block 6 is manually depressed against the restoring force of the spring 1. This causes the locking bevel 2 to move downwardly to allow the plunger 13 to engage and press the upper end of plate 3 causing the plate 3 to rotate (in the anti-clockwise direction of FIGS. 1 and 2) on pivot 5. This increases the gap between the clamp plate 7 and the supporting surface 12 so that the saw blade 9 may be easily inserted. A positioning protrusion 10 on the supporting surface 12 protrudes towards the clamp plate 7. After the saw blade 9 is inserted between the supporting surface 12 and the clamp plate 7, the positioning protrusion 10 is seated in a positioning hole 8 in the saw blade 9 (see FIG. 2).

To withdraw the blade clamp 9, the sliding block 6 is manually depressed against the restoring force of the spring 1. This causes the locking bevel 2 to move downwardly to allow the plunger 13 to engage and press the upper end of plate 3 causing the plate 3 to rotate (in the anti-clockwise direction of FIGS. 1 and 2) on pivot 5. This increases the gap between the clamp plate 7 and the blade clamp 9 so that the saw blade 9 may be withdrawn.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A keyless blade clamp mechanism for clamping a blade comprising:
    a base with a supporting surface for supporting the blade;
    a sliding block slidably mounted on the base;
    an elastic member mounted between the sliding block and the base for giving the sliding block an upward tendency; and
    a clamping lever pivotally mounted on a horizontal pivot on the base which includes on a first side of the pivot and opposed to the supporting surface a clamp plate capable of bearing against the upperside of the blade and on a second side of the pivot a downwardly dependent plate.

2. The keyless blade clamp mechanism of claim 1, further comprising:
    a locking bevel at a lower end of the sliding block; and
    a plunger at an upper end of the sliding block, wherein when the clamp plate clamps the blade, the locking bevel is engaged with an end of the dependent plate remote from the pivot and the plunger is disengaged from an end of the dependent plate at or near the pivot and when the clamp plate is unclamped, the plunger engages and presses the end of the dependent plate at or near the pivot.

3. The keyless blade clamp mechanism of claim 2, wherein the end of the dependent plate remote from the pivot is beveled and when the clamp plate clamps the blade, the locking bevel is engaged with a beveled end of the dependent plate remote from the pivot.

4. The keyless blade clamp mechanism of claim 1, wherein said elastic member is a compressed spring.

5. The keyless blade clamp mechanism of claim 2, wherein the elastic member is a compressed spring mounted between the sliding block and the base and for biasing the sliding block upwardly and giving the plunger a tendency to disengage the dependent plate.

6. The keyless blade clamp mechanism of claim 1, wherein the sliding block extends through a through hole on the clamp plate.

7. The keyless blade clamp mechanism of claim 1, wherein the dependent plate is downwardly dependent at approximately 90° to the clamp plate.

8. The keyless blade clamp mechanism of claim 1, further comprising a positioning protrusion on the supporting surface or on the clamp plate to cooperate with a positioning hole provided in the blade.

9. A blade clamp mechanism for clamping a blade comprising:
    a hollow base with opposing sides defining an upper supporting edge for supporting the blade;
    a pivot mounted prominently on the supporting edge;
    a clamping lever pivotally mounted on the pivot which includes on a first side of the pivot a clamp plate capable of bearing against the upperside of the blade supported on the supporting edge and on a second side of the pivot a plate downwardly dependent into the hollow base;
    an actuating member passing through the clamp plate for actuating the clamp plate between a clamping position in which the clamp plate is clamped against the blade supported on the supporting edge and a non-clamping position in which the clamp plate is not clamped against the blade supported on the supporting edge; and
    an elastic member mounted between the actuating member and the base for giving the actuating member an upward tendency, wherein the actuating member is compressively mounted on the hollow base such that a lower portion of the actuating member is urged into engagement with a lower portion of the dependent plate to pivotally bias the clamp plate into the clamping position.

10. The blade clamp mechanism of claim 9, wherein the elastic member is a compression spring and the actuating member is compressively mounted by the compression spring between the actuating member and the hollow base to bias the clamp plate towards the clamping position.

11. The blade clamp mechanism of claim 9, wherein the actuating member is slidably mounted on the hollow base.

12. The blade clamp mechanism of claim 9, wherein the lower portion of the actuating member has a beveled face.

13. The blade clamp mechanism of claim 9, wherein the lower portion of the dependent plate has a beveled face.

14. The blade clamp mechanism of claim 9, wherein the actuating member comprises an exteriorly manipulable plunger extending upwardly and rearwardly from a hollow lower body, wherein the hollow lower body is compressively mounted on the hollow base such that in the clamping position the plunger is linearly biased into disengagement from the upper end of the dependent plate.

15. The blade clamp mechanism of claim 14, wherein the exteriorly manipulable plunger is linearly manipulable into engagement with the upper end of the dependent plate to pivot the clamp plate into the non-clamping position.

16. The blade clamp mechanism of claim 14, wherein the elastic member is a compression spring connected internally to the hollow lower body.

17. The blade clamp mechanism of claim 9, wherein the lower portion of the dependent plate has a beveled face and the lower portion of the actuating member has a beveled face whereby the beveled face of the actuating member is urged into engagement with the beveled face of the plate to pivotally bias the clamp dependent plate into the clamping position.

18. A keyless blade clamp mechanism comprising:

a blade;

a base with a supporting surface for supporting the blade;

a sliding block slidably mounted on the base;

an elastic member mounted between the sliding block and the base for giving the sliding block an upward tendency; and a clamping lever pivotally mounted on a horizontal pivot on the base which includes on a first side of the pivot and opposed to the supporting surface a clamp plate capable of bearing against the upperside of the blade and on a second side of the pivot a downwardly dependent plate.

19. The keyless blade clamp mechanism of claim 18, further comprising:

a locking bevel at a lower end of the sliding block; and a plunger at an upper end of the sliding block, wherein when the clamp plate clamps the blade, the locking bevel is engaged with an end of the dependent plate remote from the pivot and the plunger is disengaged from an end of the dependent plate at or near the pivot and when the clamp plate is unclamped, the plunger engages and presses the end of the dependent plate at or near the pivot.

20. The keyless blade clamp mechanism of claim 19, wherein the end of the dependent plate remote from the pivot is beveled and when the clamp plate clamps the blade, the locking bevel is engaged with the beveled end of the dependent plate remote from the pivot.

* * * * *

UNITED STATES PATENT AND TRADEMARK OFFICE
CERTIFICATE OF CORRECTION

PATENT NO.   : 6,854,187 B2  Page 1 of 1
DATED        : February 15, 2005
INVENTOR(S)  : Haichun Huan It is certified that error appears in the above-identified patent and that said Letters Patent is hereby corrected as shown below:

<u>Title page,</u>
Insert Item -- [30] Foreign Application Priority Data
Chinese Patent Application No. 03112686.3, filed on January 13, 2003, and entitled "BLADE CLAMP MECHANISM." --.

Signed and Sealed this

Eleventh Day of April, 2006

JON W. DUDAS
*Director of the United States Patent and Trademark Office*